United States Patent
Le et al.

(10) Patent No.: US 7,779,233 B2
(45) Date of Patent: Aug. 17, 2010

(54) SYSTEM AND METHOD FOR IMPLEMENTING A SOFTWARE-SUPPORTED THREAD ASSIST MECHANISM FOR A MICROPROCESSOR

(75) Inventors: Hung Q. Le, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 11/877,355

(22) Filed: Oct. 23, 2007

(65) Prior Publication Data

US 2009/0106534 A1    Apr. 23, 2009

(51) Int. Cl.
G06F 9/38    (2006.01)
(52) U.S. Cl. .................................................... 712/207
(58) Field of Classification Search .................. 712/207
See application file for complete search history.

(56) References Cited

U.S. PATENT DOCUMENTS

| | | | |
|---|---|---|---|
| 6,105,051 A | 8/2000 | Borkenhagen et al. | |
| 6,216,220 B1 | 4/2001 | Hwang | |
| 6,668,317 B1 | 12/2003 | Bernstein et al. | |
| 7,343,602 B2 * | 3/2008 | Luk et al. | 718/100 |
| 7,496,732 B2 * | 2/2009 | Kottapalli et al. | 712/207 |
| 7,502,910 B2 * | 3/2009 | Damron | 712/34 |
| 7,594,096 B2 * | 9/2009 | Eickemeyer et al. | 712/207 |
| 2003/0093655 A1 | 5/2003 | Gosior et al. | |
| 2004/0133769 A1 * | 7/2004 | Chaudhry et al. | 712/233 |
| 2005/0060518 A1 | 3/2005 | Augsburg et al. | |
| 2006/0224860 A1 * | 10/2006 | Colavin et al. | 712/207 |

OTHER PUBLICATIONS

Steffan et al., "The potential for using thread-level data speculation to facilitate automatic parallelization", High-Performance Computer Architecture, 1998. Proceedings., 1998 Fourth International Symposium on (Feb. 1-4, 1998), pp. 2-13.*

(Continued)

*Primary Examiner*—William M Treat
(74) *Attorney, Agent, or Firm*—Dillon & Yudell LLP

(57) ABSTRACT

A system and computer-implementable method for implementing software-supported thread assist within a data processing system, wherein the data processing system supports processing instructions within at least a first thread and a second thread. An instruction dispatch unit (IDU) places the first thread into a sleep mode. The IDU separates an instruction stream for the second thread into at least a first independent instruction stream and a second independent instruction stream. The first independent instruction stream is processed utilizing facilities allocated to the first thread and the second independent instruction stream is processed utilizing facilities allocated to the second thread. In response to determining a result of the processing in the first independent instruction stream requires write back to registers allocated to the second thread, the IDU sets at least one selection bit to enable selective copying of content within registers allocated to the first thread to registers allocated to the second thread.

15 Claims, 4 Drawing Sheets

OTHER PUBLICATIONS

Roth et al., "Speculative data-driven multithreading", High-Performance Computer Architecture, 2001. HPCA. The Seventh International Symposium on (Jan. 19-24, 2001), pp. 37-48.*

Wallace et al., "Threaded multiple path execution", Computer Architecture, 1998. Proceedings. The 25th Annual International Symposium on (Jun. 27-Jul. 1, 1998), pp. 238-249.*

Petric et al., "Three extensions to register integration", Microarchitecture, 2002. (MICRO-35). Proceedings. 35th Annual IEEE/ACM International Symposium on (Nov. 18-22, 2002), pp. 37-47.*

* cited by examiner

| Fig. 3A |
| Fig. 3B |

SYSTEM AND METHOD FOR IMPLEMENTING A SOFTWARE-SUPPORTED THREAD ASSIST MECHANISM FOR A MICROPROCESSOR

BACKGROUND OF THE INVENTION

1. Technical Field

The present invention relates in general to the field of data processing systems, and more particularly, the present invention relates to processing data within data processing systems. Still more particularly, the present invention relates to a system and method for more efficiently processing data within multithreaded data processing systems.

2. Description of the Related Art

There is a pressure on the computer industry to increase the computing power and efficiency of microprocessors. The desire is especially evident in the server computer field where entire businesses are dependent on their computer infrastructure to carry out and monitor day to day activities that affect revenue and the like. Increased microprocessor performance will provide additional resources for computer users while providing a mechanism for computer manufacturers to distinguish themselves from the competition.

One technique utilized to improve microprocessor performance involves the capacity for a microprocessor to handle multithreaded execution. Threads enable a program to split itself into two or more simultaneously running tasks. Multiple threads can be executed in parallel in many computer systems. Thus, multithreading generally occurs by time slicing, which involves a single processor switching between different threads. Most modern computers utilize multithreading to enable a user to run more than one program at once (e.g., typing in a word processing program while simultaneously listening to music via an audio playback program). Though it appears to the user that the programs are running simultaneously, the processor is actually switching back and forth between the threads. On a multiprocessor or multi-core system, threading can be achieved via multiprocessors, wherein different threads and processes can literally run simultaneously on different processors.

Normally, in a multiprocessor that can handle multi-threaded execution, also known as a simultaneously multi-threaded (SMT) microprocessor, resource facilities are not shared between multiple threads (i.e., thread 0 facilities are only available to thread 0, while thread 1 facilities are only available to thread 1). During multithreaded execution, the processing of one thread among the multiple threads may take priority over the other threads. For example, a first thread (e.g., thread 0) may be performing a time-sensitive, processor-intensive operation and a second thread (e.g., thread 1) is performing a less important operation. In the prior art, there is no way to prioritize processing between threads, despite the fact that the first thread (e.g., thread 0) is performing a time-sensitive, processor-intensive operation. Therefore, there is a need to overcome the abovementioned limitations of the prior art.

SUMMARY OF THE INVENTION

To overcome the limitations of the prior art, it would be desirable to utilize the facilities of more than one thread (e.g., facilities of thread 0 and thread 1) to support execution of one thread to enhance the processing of a single thread (e.g., thread 0). The present invention includes a system and computer-implementable method for implementing software-supported thread assist within a data processing system, wherein the data processing system supports processing instructions within at least a first thread and a second thread. An instruction dispatch unit (IDU) places the first thread into a sleep mode. The IDU separates an instruction stream for the second thread into at least a first independent instruction stream and a second independent instruction stream. The first independent instruction stream is processed utilizing facilities allocated to the first thread and the second independent instruction stream is processed utilizing facilities allocated to the second thread. In response to determining a result of the processing in the first independent instruction stream requires write back to registers allocated to the second thread, the IDU sets at least one selection bit to enable selective copying of content within registers allocated to the first thread to registers allocated to the second thread.

The above, as well as additional purposes, features, and advantages of the present invention will become apparent in the following detailed description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF AN ILLUSTRATIVE EMBODIMENT

The present invention includes a system and computer-implementable method for implementing software-supported thread assist within a data processing system, wherein the data processing system supports processing instructions within at least a first thread and a second thread. An instruction dispatch unit (IDU) places the first thread into a sleep mode. The IDU separates an instruction stream for the second thread into at least a first independent instruction stream and a second independent instruction stream. The first independent instruction stream is processed utilizing facilities allocated to the first thread and the second independent instruction stream is processed utilizing facilities allocated to the second thread. In response to determining a result of the processing in the first independent instruction stream requires write back to registers allocated to the second thread, the IDU sets at least one selection bit to enable selective copying of content within registers allocated to the first thread to registers allocated to the second thread.

For ease of discussion, a "thread" or "thread of execution" is a sequence of instructions retrieved from system memory and processed by microprocessors. "Thread x facilities" means all hardware (e.g., registers, memory, execution units, etc.) that are allocated for processing thread x. "Thread x registers" refer to architected registers (e.g., general purpose registers (GPR) 132, floating point registers (FPR) 136, etc.) allocated for processing thread x.

Figure 1:
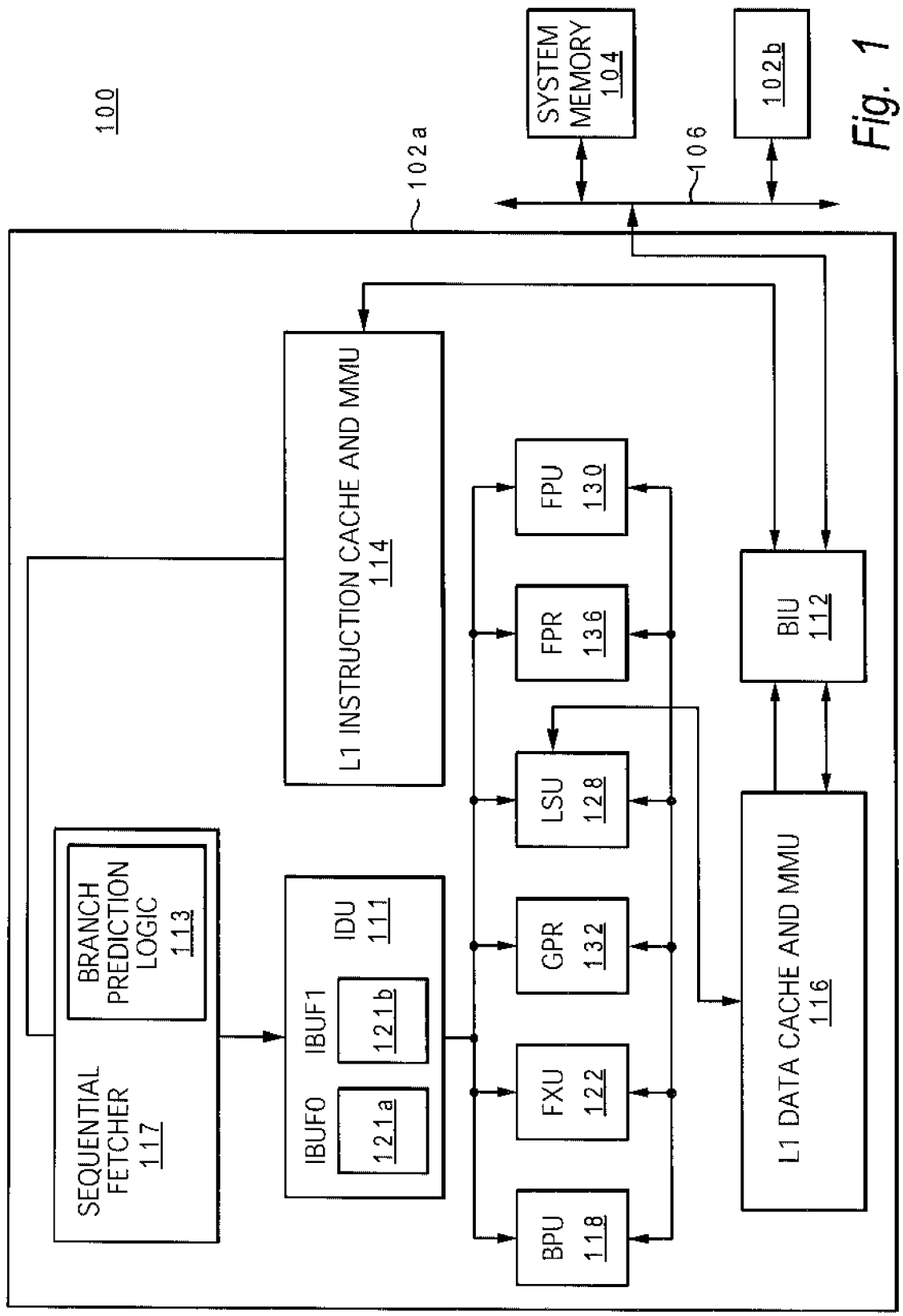
FIG. 1 is a block diagram of an exemplary data processing system in which an embodiment of the present invention may be implemented.

Referring now to the figures, and in particular, referring to FIG. 1, there is illustrated an exemplary data processing system 100 in which a preferred embodiment of the present invention may be implemented. As illustrated, data processing system 100 includes microprocessors 102*a*-102*b*, which are coupled to a system memory 104 via a system interconnect 106. Those with skill in the art will appreciate that the present invention is in no way limited to two microprocessors, but any number of microprocessors may be implemented in data processing system 100.

System memory 104 provides storage for data and instructions that are provided to, or received from microprocessors 102*a*-102*b* via system interconnect 106. In one embodiment of the present invention, data is then stored in L1 data cache and memory management unit (MMU) 116. As well-known in the art, L1 data cache and MMU 116 provide smaller, but higher speed storage for information being utilized by a microprocessor such as microprocessors 102*a*-102*b*.

In accordance with the present invention, instructions are retrieved in order by sequential fetcher 117 from L1 instruction cache and MMU 114 and provided to instruction dispatch unit (IDU) 111. Branch instructions are provided from sequential fetcher 117 to IDU 111, which sends the branch instructions to branch processing unit (BPU) 118. BPU 118 executes branch instructions that control the flow of the instruction stream by branching, or jumping, to another basic block of instructions. Conditional branch instructions evaluate a condition stored in a condition register and branch to another non-sequential instruction when the condition is satisfied and continue sequential instruction processing when the condition is not satisfied. Sequential fetcher 117 also includes branch prediction logic 113 that provides a prediction as to whether the branch will be taken or not, based on: (a) one or more hint bits, (b) the history of previously-executed branch instructions, or the like. IDU 111 includes two 64 entry instruction buffers IBUF 121*a*-121*b*, which receives the fetched instructions from sequential fetcher 117. Instructions are stored in IBUF 121*a*-121*b* while awaiting dispatch to the appropriate execution units. In the case of multithreaded processing, instructions awaiting dispatch to a first thread (e.g., thread 0) are sent to IBUF 121*a* while instructions awaiting dispatch to a second thread (e.g., thread 1) are sent to IBUF 121*b*. Those with skill in the art will appreciate that IDU 111 may include any number of instruction buffers and the present invention does not limit the number of instruction buffers to two. Also, the scope of the present invention contemplates processing any number of threads in the case of multithreaded processing and is in no way limited to two threads.

IDU 111 dispatches instructions to various execution units, such as a fixed point, or integer unit (FXU) 112 and floating point unit (FPU) 130. Both FXU 112 and FPU 130 are arithmetic/logic units that perform various functions, such as ADD, SUBTRACT, MULTIPLY, and DIVIDE. Fixed point arithmetic differs from floating point arithmetic in that scientific notation is possible with floating point operations because the radix point is capable of being moved among the digits of the number. In contrast, fixed point arithmetic implicitly sets the radix at a particular place. Fixed point and floating point arithmetic are well-known to those skilled in the art and will not be discussed further herein.

Load store unit (LSU) 128 executes instructions that either load information (data and instructions) from memory to the microprocessor registers or store information from those registers into memory. General purpose registers (GPRs) 132 are associated with FXU 122 and floating point registers (FPRs) 136 are associated with FPU 130. These registers store the arithmetic and logical results from execution of the instructions by their respective execution units.

As depicted, IDU 111 is coupled to all of the execution units and registers such that any type of instruction can be dispatched from IDU 111. Further, the output of the execution units 122, 128, and 130 are coupled to the general purpose registers (GPRs) 132 and floating point registers (FPRs) 136 such that the execution units can store results to the registers from executed instructions and then retrieve those results to be used in processing existing or future instructions. The elements shown in microprocessor 102*a* and described above can be considered to constitute the "core" of a microprocessor. Also, the present invention includes the utilization of microprocessors that may include multiple cores, which may include multiple execution units.

Figure 2:
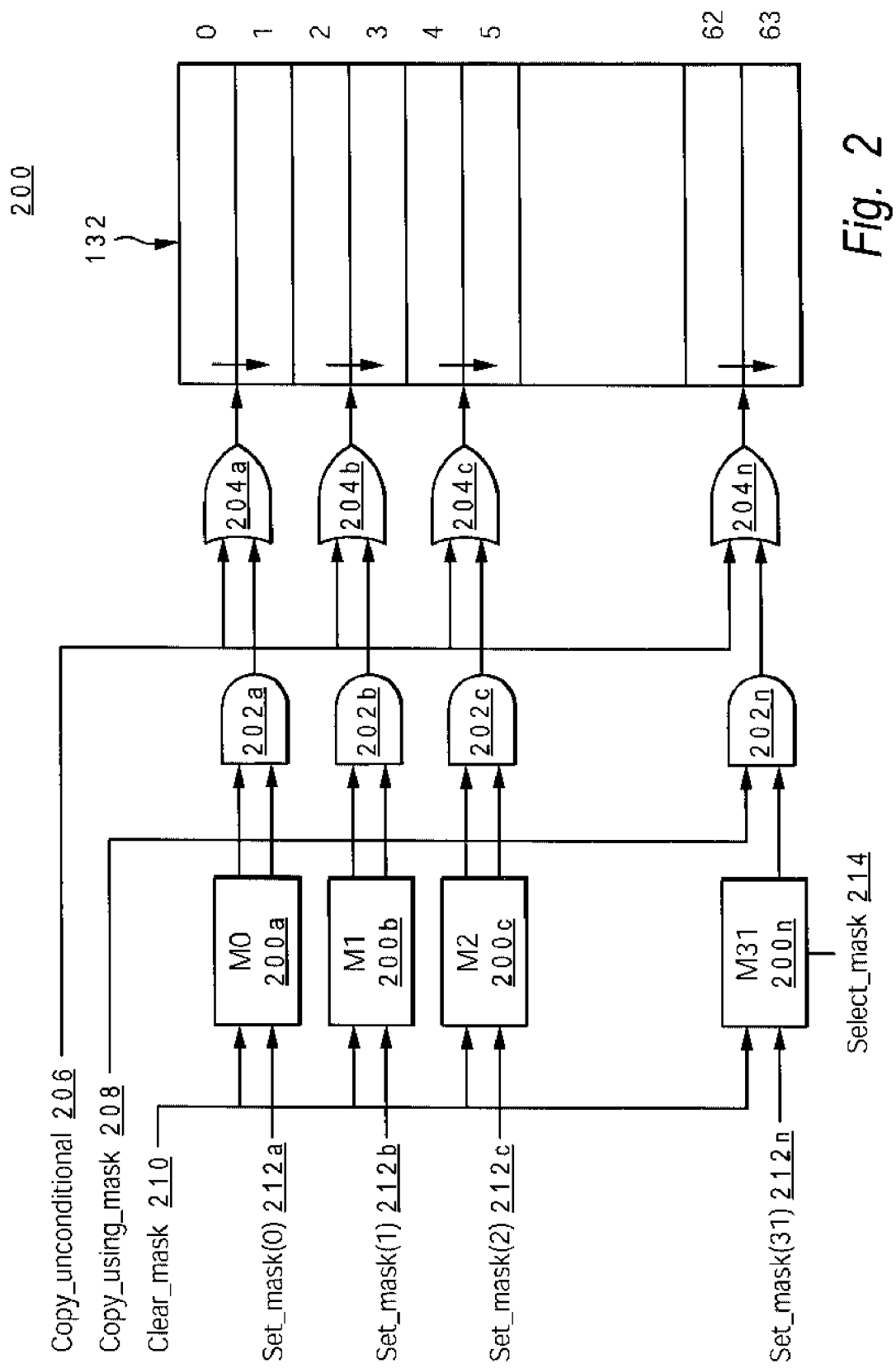
FIG. 2 is a block diagram of exemplary general purpose register (GPR) and mask organization according to an embodiment of the present invention.

FIG. 2 is a more detailed block diagram of GPR 132 and the connections coupled to GPR 132. As depicted, GPR 132 is a 32-bit register that includes 64 entries to enable GPR 132 to store data from two different threads in an interleaved manner. For example, location 0 in GPR 132 represents the first data block for thread 0 and location 1 in GPR 132 represents the first data block for thread 1 in GPR 132. It should be understood that GPR 132 is illustrated as a 32-bit register with 64 entries merely as an example and should not be considered a limitation. Those skilled in the art will readily comprehend how GPR 132 (as well as other types of architected facilities such as floating point registers) of various sizes (e.g., 8, 16, 64, 128, and the like) are contemplated within the scope of the present invention. Also, those skilled in the art will appreciate that while GPR 132 is depicted as interleaving two threads within the register entries, such depiction is utilized merely as an example and should not be considered a limitation. The present invention applies to any number of interleaved threads within GPR 132 or any other type of architected facilities within data processing system 100.

Coupled to GPR 132 are masks 200*a*-200*n*, AND gates 202*a*-202*n*, and OR gates 204*a*-204*n*, which, along with signals copy_unconditional 206, copy_using_mask 208, clear_mask 210, set_mask 212, and select_mask 214, collectively enable data processing system 100 to copy the contents of one thread to another through logic gates 202*a*-202*n* and 204*a*-204*n*.

Figure 3:
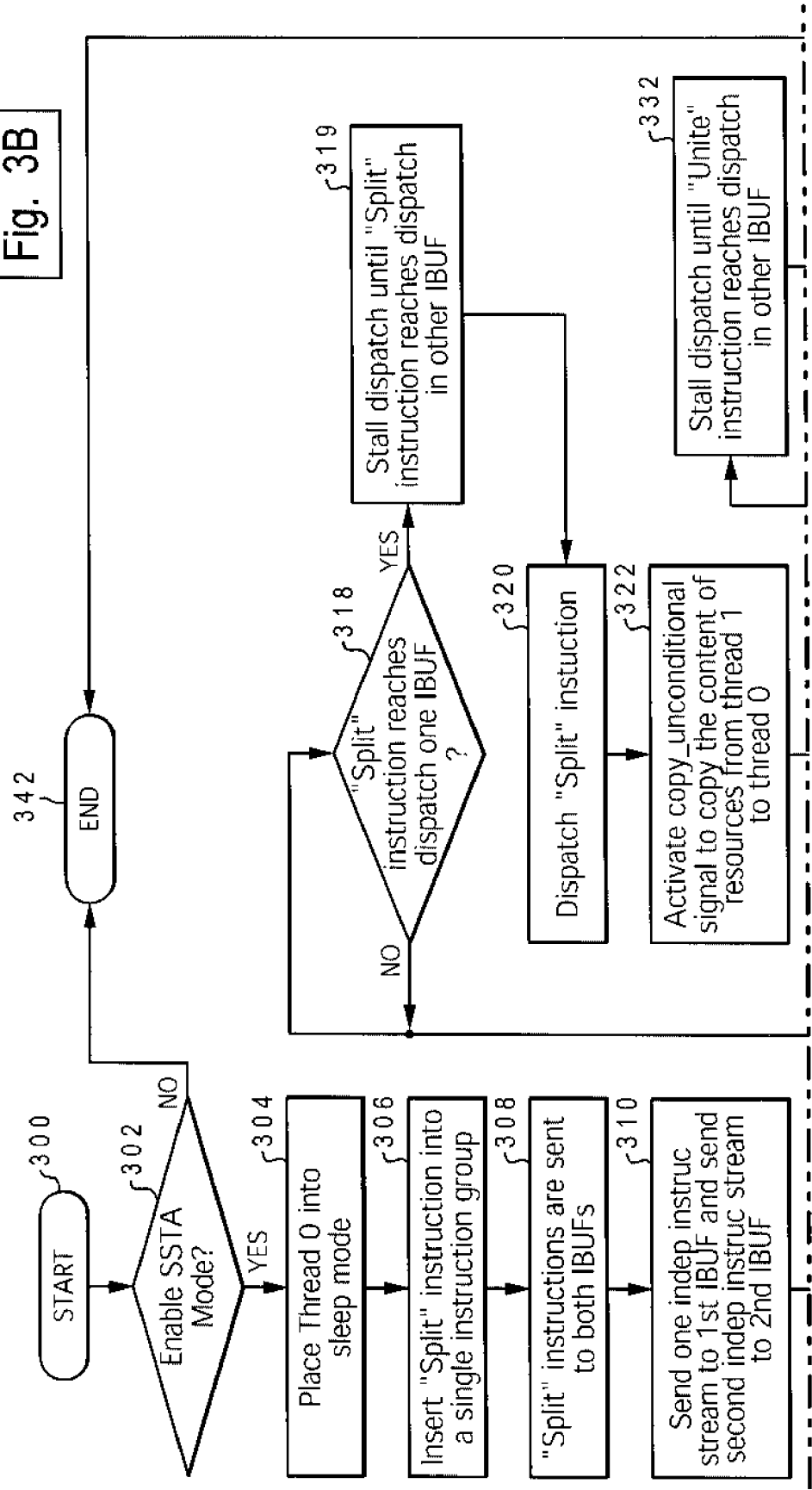
FIG. 3 is a high-level logical flowchart illustrating an exemplary method for implementing software-supported thread assist for a microprocessor in accordance with an embodiment of the present invention.
Figure 3B:
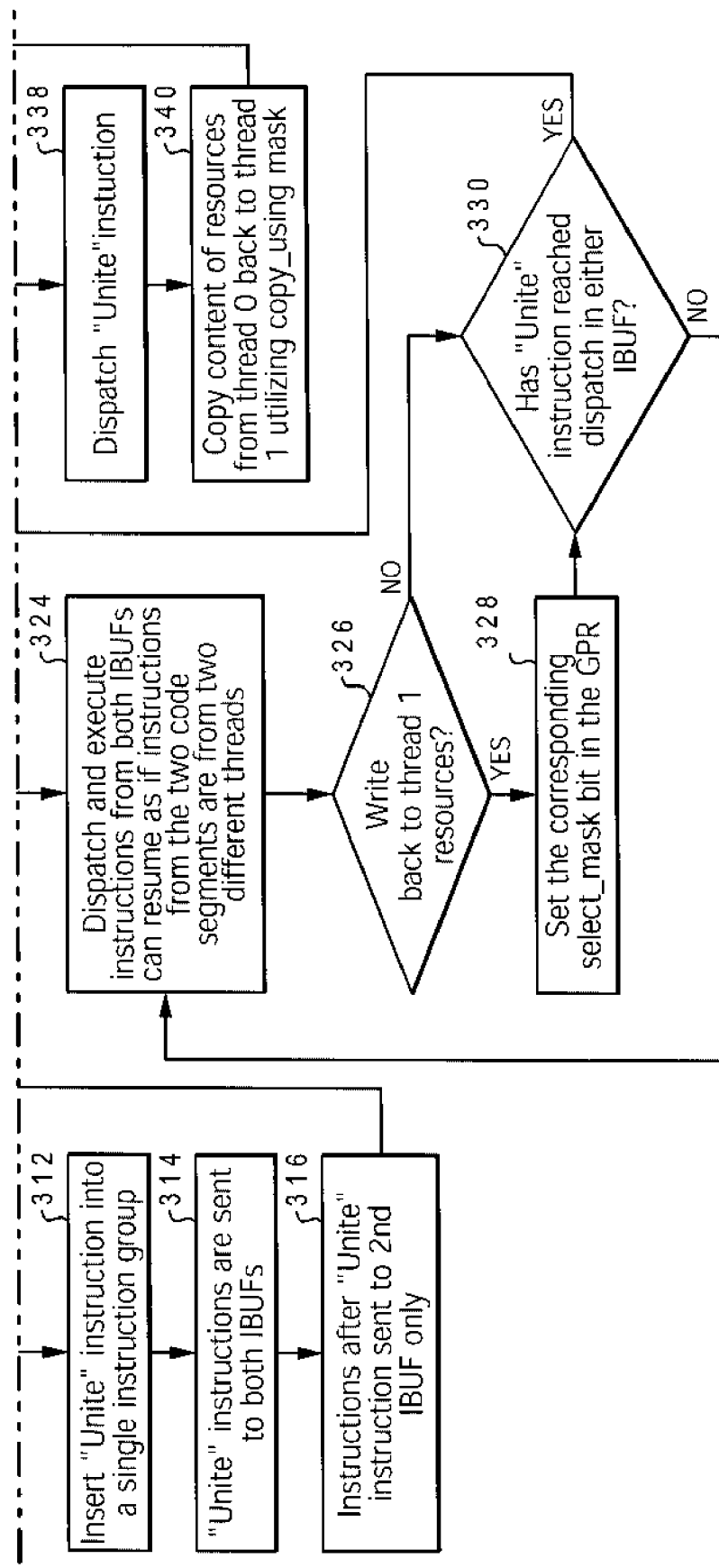

For example, as discussed in more detail in conjunction with FIG. 3, when an instruction activates the software-supported thread assist (SSTA) function, copy_unconditional signal 206 is activated to copy the contents of thread 1 registers to thread 0 registers. If the content of only certain registers are to be copied between thread 1 registers and thread 0 registers (or vice versa), copy_using_mask signal 208 is utilized. Set_mask signals 212*a*-212*n* are set when an instruction is writing back a result to a GPR location allocated within thread 1 registers. By utilizing the SSTA function, both thread 0 and thread 1 facilities may be utilized to support execution of independent instruction streams of one thread to enhance single thread performance.

As discussed in more detail in conjunction with FIG. 3, once processing of independent instruction streams within the facilities of thread 0 and thread 1 are complete, IDU 111 must copy the results of the processing within thread 0 registers within GPR 132 back to the thread 1 registers. Masks 200*a*-200*n*, when selectively activated by set_mask signals 212*a*-212*n* and select_mask signal 214 control the copy of the corresponding GPR from thread 0 registers to thread 1 registers, depending on whether an active bit is set or not. For example, if bit 5 of mask 5 (e.g., mask 200*e*) is active and copy_using_mask signal 208 is asserted, the contents of GPR5 of thread 0 registers is copied to GPR5 of thread 1 registers. Masks 200a-200n are controlled by clear_mask signal 210, which clears all bits of masks 200a-200n to an inactive state, and set_mask signals 212a-212n.

FIG. 3 is a high-level logical flowchart diagram illustrating an exemplary method for implementing software-supported thread assist for a microprocessor according to an embodiment of the present invention. For the ease of discussion, assume that microprocessor 102a is processing two threads, thread 0 and thread 1. Those with skill in the art will appreciate that the present invention includes a microprocessor processing any number of threads and does not limit the number of threads to two. Thread 1 includes the following instructions, which are retrieved from system memory 104, brought into L1 instruction cache and MMU 114 as requested, and dispatched by IDU 111:

| Thread 1 |
|---|
| <instructions> |
| <"Split"> |
| <independent instruction stream 0> |
| <independent instruction stream 1> |
| <"Unite"> |
| <further instructions> |

For the purpose of discussion, assume that thread 0 facilities and thread 1 facilities will be utilized to improve the processing of instructions within thread 1. The "Split" instruction splits the thread 1 instruction stream by sending independent instruction stream 0 to thread 0 facilities and independent instruction stream 1 to thread 1 facilities. The "unite" instruction copies results from the processing within thread 0 facilities during SSTA mode back to thread 1 to enable thread 1 to process further instructions in a non-SSTA (or "normal") mode. Also, both the "Split" and "Unite" instructions are sent to both IBUF 121a-121b to act as markers to ensure that thread 0 facilities and thread 1 facilities are properly synchronized during SSTA mode. For example, as discussed in more detail in steps 319 and 332, when a "Split" instruction has reached dispatch in one of IBUF 121a-121b, IDU 111 stalls dispatch in that particular IBUF until a "Split" instruction has reached dispatch in the other IBUF. Likewise, when an "Unite" instruction has reached dispatch in one of IBUF 121a-121b, IDU 111 stalls dispatch in that particular IBUF until an "Unite" instruction has reached dispatch in the other IBUF.

The process begins at step 300, and proceeds to step 302, which illustrates a determination made as to whether the software-supported thread assist (SSTA) mode is to be activated. In an embodiment of the present invention, execution units such as BPU 118, FXU 112, FPR 136 execute instructions dispatched by IDU 111 from L1 instruction cache and MMU 114. One instruction dispatched by IDU 111 is a SSTA_mode_activate instruction, which enables the SSTA mode. IDU 111 determines whether a dispatched instruction is a SSTA_mode_activate instruction. If the dispatched instruction is not a SSTA_mode_activate instruction, the process proceeds to step 342, which illustrates the process ending.

If the dispatched instruction is a SSTA_mode_activate instruction, the process continues to step 304, which illustrates a software instruction placing a thread (e.g., thread 0) into a nap/sleep mode. In an embodiment of the present invention, a software instruction loaded from system memory 104 and dispatched by IDU 111 initiates a process to store GPR content of thread 0 registers into system memory 104 before processor 102a can begin execution of instructions in SSTA mode. When processor 102a returns to multi-threaded mode (SMT) from SSTA mode, the GPR content of thread 0 registers must be restored from memory before instructions from thread 0 can be dispatched by IDU 111 and executed by the execution units. The process continues to step 306, which illustrates IDU 111 placing a "Split" instruction into a single instruction group. The process proceeds to step 308, which depicts IDU 111 placing "Split" instructions into both IBUF 121a-121b.

The process continues to step 310, which shows IDU 111 sending a first independent instruction stream (e.g., independent instruction stream 0) to IBUF 121a and a second independent instruction stream (e.g., independent instruction stream 1) to IBUF 121b. According to an embodiment of the present invention, for an instruction stream to be considered "independent": (1) the instruction stream must not include instructions that are dependent on the results of instructions in another instruction stream; and (2) the software resident on system memory 104 whose instructions are retrieved by and executed on microprocessors 102a-102n must encapsulate the independent instruction stream with a pair of "Split" and "Unite" instructions.

The process continues to step 312, which illustrates IDU 111 inserting "Unite" instructions into single instruction groups. The process proceeds to step 314, which depicts IDU 111 sending the "Unite" instructions to IBUF 121a-121b. As previously discussed, the "Unite" instructions separate the independent instruction streams from the rest of the instructions. The process continues to step 316, which shows IDU 111 sending the "Unite" instructions to IBUF 121a-121b.

The process proceeds to step 318, which illustrates IDU 111 determining if a "Split" instruction has reached dispatch in one of IBUF 121a-121b. If a "Split" instruction has not reached dispatch, the process iterates at step 318. If a "Split" instruction has reached dispatch in one of IBUF 121a-121b, the process continues to step 319, which illustrates IDU 111 stalling dispatch of the "Split" instruction until a "Split" instruction reaches dispatch in the other thread. Both the "Split" and "Unite" instructions act as synchronizing commands to ensure that the facilities of both threads enter and exit SSTA mode at the same time.

Once the "Split" instruction has reached dispatch in both IBUF 121a-121b, the process continues to step 320, which depicts IBUF 121a-121b dispatching both "Split" instructions at the same time. The process proceeds to step 322, which shows IDU 111 activating copy_unconditional signal 206 to copy the content of resources from thread 1 to thread 0.

The process continues to step 324, which illustrates IDU 111 dispatching instructions from independent instruction stream 0 and independent instruction stream1 from IBUF 121a-121b for execution as if the instructions from the two code segments are from two different threads. The process proceeds to step 326, which depicts IDU 111 determining whether write back is required to thread 1 registers within GPR 132. If write-back is required to thread 1 registers with GPR 132, IDU 111 sets the corresponding select_mask bit by activating a select_mask signal 214 that corresponds to the target register for the write back command. The process continues to step 330, which shows IDU 111 determining if a "Unite" instruction has reached dispatch in either IBUF 121a-121b. Returning to step 326, if IDU 111 determines that write back is not required to thread 0 registers with GPR 132, the process proceeds to step 330.

Returning to step 330, if IDU 111 determines that a "Unite" instruction has reached dispatch in IBUF 121a-121b, IDU 111 stalls dispatch of the "Unite" instruction until a "Unite" instruction reaches dispatch in the other IBUF, as illustrated in step 332. If a "Unite" instruction has reached dispatch in the other IBUF, IDU 111 dispatches the "Unite" instruction in both IBUF 121a-121b, as depicted in step 338. IDU 111 copies the register content of thread 0 registers (within GPR 132) back to thread 1 registers by activating copy_using_mask signal 208, as illustrated at step 340. The process ends, as shown in step 342. Returning to step 330, if the "Unite" instruction has not reached dispatch in either thread, the process returns to step 324.

As discussed, the present invention includes a system and computer-implementable method for implementing software-supported thread assist within a data processing system, wherein the data processing system supports processing instructions within at least a first thread and a second thread. An instruction dispatch unit (IDU) places the first thread into a sleep mode. The IDU separates an instruction stream for the second thread into at least a first independent instruction stream and a second independent instruction stream. The first independent instruction stream is processed utilizing the first thread and the second independent instruction is processed utilizing the second thread. In response to determining a result of the processing in the first independent instruction stream requires write back to registers allocated to the second thread, the IDU sets at least one selection bit to enable selective copying of registers allocated to the first thread to registers allocated to the second thread.

It should be understood that at least some aspects of the present invention may alternatively be implemented as a program product. Program code defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to Random Access Memory (RAM), and communication media, such as computer and telephone networks including Ethernet, the Internet, wireless networks, and like network systems. It should be understood, therefore, that such signal-bearing media when carrying or encoding computer-readable instructions that direct method functions in the present invention represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention.

What is claimed is:

1. A computer-implementable method for implementing software-supported thread assist within a data processing system, wherein said data processing system supports processing instructions within at least a first thread and a second thread, said method comprising:
   placing said first thread into a sleep mode;
   separating an instruction stream for said second thread into at least a first independent instruction stream and a second independent instruction stream;
   processing said first independent instruction stream utilizing facilities allocated to said first thread and processing said second independent instruction stream utilizing facilities allocated to said second thread; and
   in response to determining a result of said processing in said first independent instruction stream requires write back to registers allocated to said second thread, setting at least one selection bit to enable selective copying of registers allocated to said first thread to said registers allocated to said second thread.

2. The computer-implementable method according to claim 1, further comprising:
   in response to placing said first thread into a sleep mode, copying content of said registers allocated to said first thread to memory.

3. The computer-implementable method according to claim 1, further comprising:
   forwarding a split instruction to a first buffer allocated to said first thread and to a second buffer allocated to said second thread;
   sending said first independent instruction stream to said first buffer allocated to said first thread;
   transferring said second independent instruction stream to said second buffer allocated to said second thread; and
   submitting a unite instruction to said first buffer allocated to said first thread and to said second buffer allocated to said second thread.

4. The computer-implementable method according to claim 3, further comprising:
   in response to determining said split instruction has reached dispatch in one buffer among said first buffer and said second buffer, stalling dispatch of said split instruction until said split instruction has reached dispatch in another buffer among said first buffer and said second buffer.

5. The computer-implementable method according to claim 3, further comprising:
   in response to determining said unite instruction has reached dispatch in one buffer among said first buffer and said second buffer, stalling dispatch of said unite instruction until said unite instruction has reached dispatch in another buffer among said first buffer and said second buffer.

6. A data processing system for implementing software-supported thread assist, wherein said data processing system supports processing instructions within at least a first thread and said second thread, said data processing system comprising:
   a system memory; and
   at least one processor coupled to said system memory, wherein said at least one processor is;
   configured for:
      placing said first thread into a sleep mode;
      separating an instruction stream for said second thread into at least a first independent instruction stream and a second independent instruction stream;
      processing said first independent instruction stream utilizing facilities allocated to said first thread and processing said second independent instruction stream utilizing facilities allocated to said second thread; and
      in response to determining a result of said processing in said first independent instruction stream requires write back to registers allocated to said second thread, setting at least one selection bit to enable selective copying of registers allocated to said first thread to said registers allocated to said second thread.

7. The data processing system according to claim 6, wherein said said at least one processor is further configured for:

in response to placing said first thread into a sleep mode, copying content of said registers allocated to said first thread to memory.

8. The data processing system according to claim 6, wherein said said at least one processor is further configured for:
- forwarding a split instruction to a first buffer allocated to said first thread and to a second buffer allocated to said second thread;
- sending said first independent instruction stream to said first buffer allocated to said first thread;
- transferring said second independent instruction stream to said second buffer allocated to said second thread; and
- submitting a unite instruction to said first buffer allocated to said first thread and to said second buffer allocated to said second thread.

9. The data processing system according to claim 8, wherein said said at least one processor is further configured for:
- in response to determining said split instruction has reached dispatch in one buffer among said first buffer and said second buffer, stalling dispatch of said split instruction until said split instruction has reached dispatch in another buffer among said first buffer and said second buffer.

10. The data processing system according to claim 8, wherein said said at least one processor is further configured for:
- in response to determining said unite instruction has reached dispatch in one buffer among said first buffer and said second buffer, stalling dispatch of said unite instruction until said unite instruction has reached dispatch in another buffer among said first buffer and said second buffer.

11. A computer-usable storage medium embodying computer program code for implementing software-supported thread assist within a data processing system that supports processing instructions within at least a first thread and a second thread, said computer-usable storage medium comprising:
- program code for placing said first thread into a sleep mode;
- program code for separating an instruction stream for said second thread into at least a first independent instruction stream and a second independent instruction stream;
- program code for processing said first independent instruction stream utilizing facilities allocated to said first thread and processing said second independent instruction stream utilizing facilities allocated to said second thread; and
- program code for, in response to determining a result of said processing in said first independent instruction stream requires write back to registers allocated to said second thread, setting at least one selection bit to enable selective copying of registers allocated to said first thread to said registers allocated to said second thread.

12. The computer-usable storage medium according to claim 11, wherein said computer-usable storage medium further comprises program code for:
- in response to placing said first thread into a sleep mode, copying content of said registers allocated to said first thread to memory.

13. The computer-usable storage medium according to claim 11, wherein said computer-usable storage medium further comprises program code for:
- forwarding a split instruction to a first buffer allocated to said first thread and to a second buffer allocated to said second thread;
- sending said first independent instruction stream to said first buffer allocated to said first thread;
- transferring said second independent instruction stream to said second buffer allocated to said second thread; and
- submitting a unite instruction to said first buffer allocated to said first thread and to said second buffer allocated to said second thread.

14. The computer-usable storage medium according to claim 11, wherein said computer-usable storage medium further comprises program code for:
- in response to determining said split instruction has reached dispatch in one buffer among said first buffer and said second buffer, stalling dispatch of said split instruction until said split instruction has reached dispatch in another buffer among said first buffer and said second buffer.

15. The computer-usable storage medium according to claim 11, wherein said computer-usable storage medium further comprises program code for:
- in response to determining said unite instruction has reached dispatch in one buffer among said first buffer and said second buffer, stalling dispatch of said unite instruction until said unite instruction has reached dispatch in another buffer among said first buffer and said second buffer.

* * * * *